United States Patent
Ebisawa

(10) Patent No.: US 7,616,626 B2
(45) Date of Patent: Nov. 10, 2009

(54) TELEPHONE EXCHANGE APPARATUS AND CONTROL METHOD FOR TELEPHONE EXCHANGE APPARATUS

(75) Inventor: Yoshimitsu Ebisawa, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 944 days.

(21) Appl. No.: 10/990,403

(22) Filed: Nov. 18, 2004

(65) Prior Publication Data

US 2005/0117572 A1 Jun. 2, 2005

(30) Foreign Application Priority Data

Nov. 28, 2003 (JP) .............................. 2003-400791

(51) Int. Cl.
*H04L 12/50* (2006.01)
*H04M 1/00* (2006.01)

(52) U.S. Cl. .................... 370/357; 379/156; 379/165

(58) Field of Classification Search ............... 370/357, 370/465, 381–383, 352–354, 358–360, 384, 370/385; 379/156, 165, 9.04, 201.01–201.03
See application file for complete search history.

(56) References Cited

U.S. PATENT DOCUMENTS

| | | | | |
|---|---|---|---|---|
| 5,586,121 A * | 12/1996 | Moura et al. ................. | 370/404 |
| 5,631,901 A * | 5/1997 | Nishida ....................... | 370/384 |
| 6,141,322 A * | 10/2000 | Poretsky ..................... | 370/231 |
| 6,178,168 B1 * | 1/2001 | Andersson et al. .......... | 370/360 |
| 6,295,350 B1 * | 9/2001 | Schreyer et al. ........ | 379/221.01 |
| 6,529,499 B1 * | 3/2003 | Doshi et al. ................. | 370/352 |
| 6,587,890 B1 * | 7/2003 | Kult et al. ................... | 719/328 |
| 6,643,262 B1 * | 11/2003 | Larsson et al. .............. | 370/236 |
| 7,221,945 B2 * | 5/2007 | Milford et al. ........... | 455/452.1 |
| 7,324,637 B2 * | 1/2008 | Brown et al. ........... | 379/207.02 |
| 2001/0027484 A1 * | 10/2001 | Nishi ......................... | 709/223 |
| 2004/0028036 A1 * | 2/2004 | Mose et al. ................. | 370/353 |
| 2005/0117727 A1 * | 6/2005 | Tahi ........................... | 379/156 |
| 2007/0027484 A1 * | 2/2007 | Guzman et al. ................ | 607/2 |

FOREIGN PATENT DOCUMENTS

| | | |
|---|---|---|
| JP | 11-3273 | 1/1999 |
| JP | 2000-267869 | 9/2000 |
| JP | 2001-268607 | 9/2001 |

OTHER PUBLICATIONS

Search Report issued by the British Patent Office, dated Mar. 24, 2005, for British Application No. GB0424267.3.

* cited by examiner

*Primary Examiner*—Kwang B Yao
*Assistant Examiner*—Candal Elpenord
(74) *Attorney, Agent, or Firm*—Finnegan, Henderson, Farabow, Garrett & Dunner, L.L.P.

(57) ABSTRACT

A telephone exchange apparatus includes a memory which stores a plurality of resource information for executing mutually different plural communication service functions, a recorder which records communication signals for processing in the each resource information, on a recording medium, a processor which processes the communication signals based on the corresponding resource information stored in the memory, and a controller which controls to manage the communication signals on the recording medium by each resource, and releases the corresponding resource area on the recording medium according to the communication service function requesting to release.

18 Claims, 6 Drawing Sheets

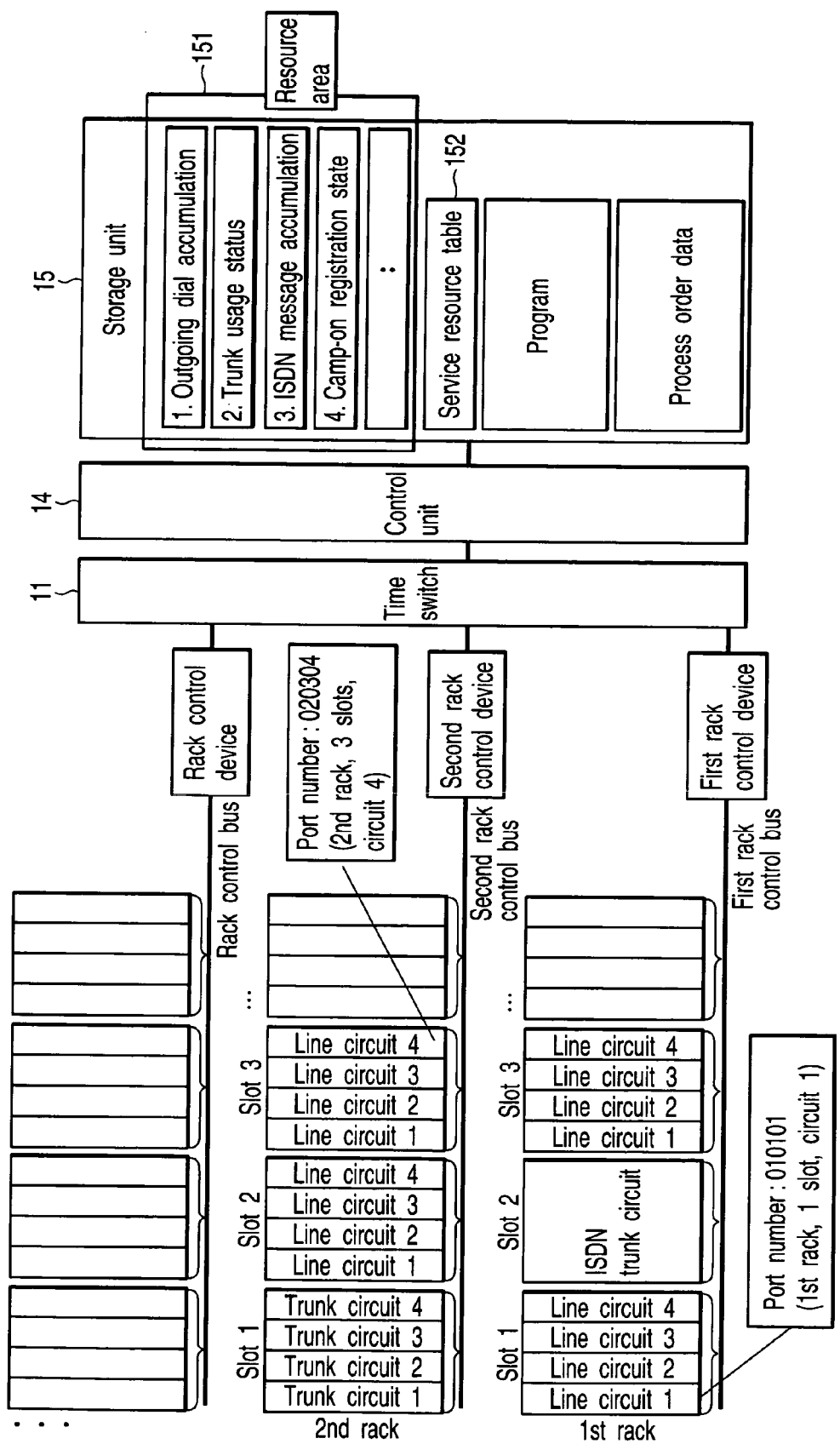
F I G. 2

|  | Outgoing service | | | | | | Incoming service | | | | | |
|---|---|---|---|---|---|---|---|---|---|---|---|---|
| Outgoing side classification | Trunk | | | Extension | | | Trunk | | | Extension | | |
| Capturing circuit classification | ISDN | Analog | | ISDN | Analog | | ISDN | Analog | | ISDN | Analog | |
| 1. Outgoing dial accumulation | ○ | ○ | | ○ | ○ | | | | | | | |
| 2. Trunk usage status | ○ | ○ | | | | | ○ | ○ | | | | |
| 3. ISDN message accumulation | ○ | | | ○ | | | ○ | | | ○ | | |
| 4. Camp-on registration state | | | | | | | △ | △ | | △ | △ | |

○ = Resource use
△ = Resource use depending on condition

FIG. 3

TELEPHONE EXCHANGE APPARATUS AND CONTROL METHOD FOR TELEPHONE EXCHANGE APPARATUS

CROSS-REFERENCE TO RELATED APPLICATIONS

This application is based upon and claims the benefit of priority from prior Japanese Patent Application No. 2003-400791, filed Nov. 28, 2003, the entire contents of which are incorporated herein by reference.

BACKGROUND OF THE INVENTION

1. Field of the Invention

The present invention relates to a telephone exchange apparatus for executing communication service functions relating to any one of exchanges between mutual extensions, between an extension and a line wire, and between mutual line wires, and more particularly to a telephone exchange apparatus and a control method for the telephone exchange apparatus intended to improve recovery from failure.

2. Description of the Related Art

Hitherto, in office and other buildings, the telephone exchange apparatuses such as a key telephone apparatus and a private branch exchange (PBX) have been widely used. This kind of telephone exchange apparatus contains telephone sets or the like as extension terminals, and enables calls by switching and connecting between the extension terminals and the external network such as a public telephone network, and between mutual extension terminals.

In such a telephone exchange apparatus, if any abnormality occurs in a resource for executing the communication service function, such a resource failure cannot be recognized by a maintenance engineer or the like. Therefore, the telephone exchange apparatus may be left over for a long time while the resource is abnormal, and it often causes troubles in management of the apparatus.

Accordingly, there have been proposed a method of initializing the process by determining resource abnormality and using this abnormal resource (for example, see Jpn. Pat. Appln. KOKAI Publication No. 2000-267869), and a method of releasing, at the time of a call, an illegally used resource by checking whether or nor a resource corresponding to the call is used illegally (for example, see Jpn. Pat. Appln. KOKAI Publication No. 2001-268607).

In these methods, however, the corresponding resource cannot be released if failure occurs in the midst of execution of communication service function. Also in such methods, the normal resource may be adversely influenced if the resource is released or the process using the corresponding resource is initialized during execution of the communication service function.

BRIEF SUMMARY OF THE INVENTION

It is hence an object of the invention to provide a telephone exchange apparatus and a control method for the telephone exchange apparatus intended to act effectively against operation failure possibly occurring in every communication service function.

According to an aspect of the present invention, there is provided a telephone exchange apparatus for accommodating a plurality of extensions adapted to connect telephone terminals to each terminal end and connecting at least one line wire, the telephone exchange apparatus executing communication service functions relating to at least one of switches between mutual extensions, between an extension and a line wire, and between mutual line wires, comprising: a memory which stores a plurality of resource information for executing mutually different plural communication service functions; a recorder which records communication signals for processing in the each resource information, on a recording medium; a processor which processes the communication signals on the recording medium based on the corresponding resource information stored in the memory; and a controller which controls to manage the communication signals on the recording medium by each resource, and releases the corresponding resource area on the recording medium according to the communication service function requesting to release.

According to another aspect of the present invention, there is provided a control method for use in a telephone exchange apparatus for accommodating a plurality of extensions adapted to connect telephone terminals to each terminal end and connecting at least one line wire, the telephone exchange apparatus executing communication service functions relating to any one of exchanges between mutual extensions, between an extension and a line wire, and between mutual line wires, the control method comprising: storing a plurality of resource information for executing mutually different plural communication service functions; recording communication signals for processing in each resource information, on a recording medium, and managing the communication signals on the recording medium by each resource, and releasing the corresponding resource area on the recording medium according to the communication service function requesting to release.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIG. 2 is a block diagram showing a connection state of a time switch, a control unit and a storage unit shown in FIG. 1;

FIG. 3 is a diagram showing an example of stored contents of a resource table shown in FIG. 2;

DETAILED DESCRIPTION OF THE INVENTION

Figure 1:
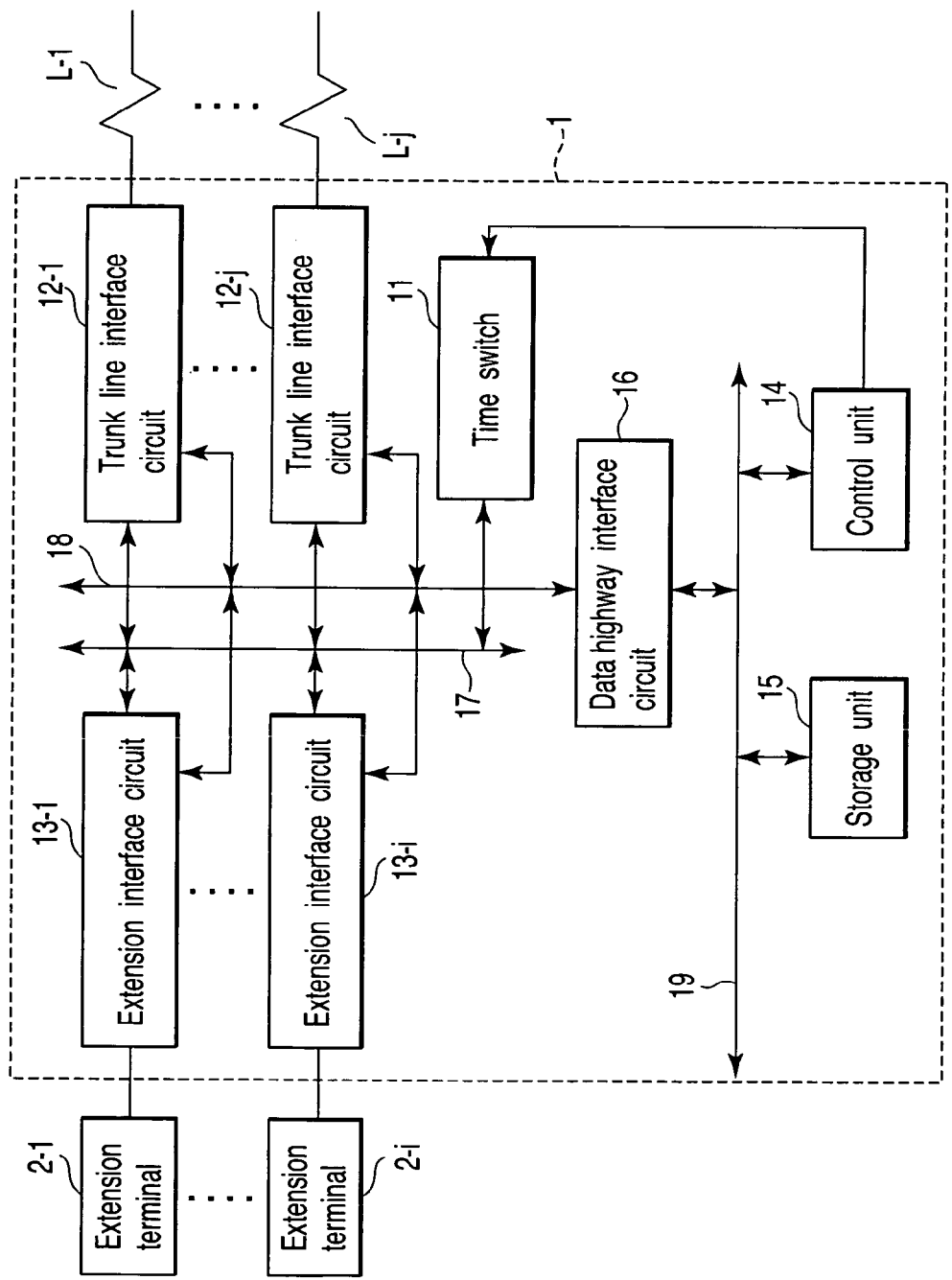
FIG. 1 is a block diagram showing a schematic configuration of an exchange system according to a first embodiment of the present invention.

Referring now to the drawings, embodiments of the invention will be specifically described below.

FIRST EMBODIMENT

FIG. 1 is a block diagram showing a schematic configuration of a switching system according to a first embodiment of the invention.

The switching system comprises, as shown in the diagram, a main apparatus 1, and a plurality (maximum i pieces) of extension terminals 2 (2-1 to 2-i) which are arbitrarily connected thereto by way of individual communication ports. The extension terminals 2 include, for example, key telephone sets and standard telephone sets.

The main apparatus 1 further includes a time switch 11, a plurality (j pieces) of trunk line interface circuits 12 (12-1 to 12-j) (hereinafter referred to as trunk line IF 12), a plurality (i pieces) of extension interface circuits 13 (13-1 to 13-i) (hereinafter referred to as extension IF 13), a control unit 14, a storage unit 15, and a data highway interface unit 16 (hereinafter referred to as DHW IF 16), and the time switch 11, trunk line IF 12, and extension IF 13 are mutually connected by way of a PCM highway 17.

Further, the trunk line IF 12, extension IF 13, and DHW IF 16 are mutually connected by way of a data highway 18. The time switch 11, control unit 14, storage unit 15, and DHW IF 16 are mutually connected by way of a CPU bus 19.

The time switch 11 arbitrarily switches and connects the mutual extension IF 13, and trunk line IF 12 and extension IF 13 according to the control of the control unit 14.

In the trunk line IF 12, office lines L (L-1 to L-j) of ISDN network, public telephone network and private lines as a line wire are connected as required. The trunk line IF 12 executes trunk line interface operation about the connected office lines L. The trunk line interface operation includes conversion of an audio signal (analog) to be supplied through the office line L into a PCM signal, conversion of a PCM signal to be supplied through the time switch 11 into an audio signal (analog), monitoring of state of the office line L, and transmission of various signals to the network connected by the office lines L. Further, the trunk line IF 12 transmits/receives various control information about the trunk line interface operation to/from the control unit 14 by way of the data highway 18, DHW IF 16, and CPU bus 19.

The extension terminals 2 are connected as required to the extension IF 13. The extension IF 13 executes extension interface operation about the connected extension terminals 2. The extension interface operation includes extraction of a PCM signal to be outputted from the extension terminal 2 from the PCM highway 17, monitoring of state of the extension terminal 2, and transmission of various signals to the extension terminal 2. The extension IF 13 also transmits/receives various control information about the extension interface operation to/from the control unit 14 by way of the data highway 18, DHW IF 16, and CPU bus 19.

The DHW IF 16 transmits/receives data between the data highway 18 and CPU bus 19.

The control unit 14 processes according to the operation program stored in the storage unit 15, whereby the time switch 11, trunk line IF 12, and extension IF 13 are supervised and controlled, and the operation of the main apparatus 1 is realized.

The storage unit 15 stores the operation program of the control unit 14 and other various data used perpetually.

FIG. 2 is a block diagram showing the connection state of the time switch 11, control unit 14, and storage unit 15.

In the main apparatus 1, as shown in the diagram, objects of control are divided into a circuit, a slot, a rack, and a system. The storage unit 15 stores programs and process order data determined by the user, and various resource areas 151 for various service operations, and the area is acquired or released dynamically by start or end of service. Each resource is managed by the resource releasing process of each circuit, each slot, each rack, and each system.

The storage unit 15 also includes a resource table 152 having stored therein setting information showing vacancy or occupancy of each source, about each one of the communication service functions as shown in FIG. 3.

In such configuration, the processing operation will be explained.

(Ordinary Operation)

(1) Outgoing from Extension to ISDN Trunk

When outgoing to an ISDN trunk from a certain extension, first, in order to store the dialed number, an outgoing dial accumulation area is captured out of the resource area 151. When all dials are entered, the numbers are analyzed, and the trunk to be captured is determined. Referring to the trunk usage state in the resource area 151, if the trunk attempted to be captured has been already used, a next candidate is searched, or a busy signal is returned to the transmission side. If the trunk attempted to be captured is not used, the trunk is set in the usage state. Next, to compile an ISDN message to be sent out to the network, the ISDN message accumulation of the resource area 151 is urged, and the ISDN message is created and transmitted to the trunk.

(2) Incoming from ISDN Trunk

When incoming from the ISDN trunk, the trunk usage state of the resource area 151 is set in busy state. Keeping an ISDN message accumulation area in the resource area 151, the ISDN message received from the network is stored in this area, and the ISDN message is analyzed. As a result of analysis, when the incoming destination is determined, if the incoming destination has been already used, camp-on registration is recorded in the camp-on registration state area of the resource area 151, and the camp-on state is established.

This is the normal system process of ISDN trunk outgoing and incoming. If an area is in shortage, the process is as follows.

(3) If Outgoing Dial Accumulation Area Cannot be Captured

As for outgoing, due to shortage of outgoing dial accumulation area, outgoing to trunk or extension is all disabled. There is no problem about incoming.

(4) If Trunk Usage State Area Cannot be Captured

The trunk state cannot be held, and all trunk outgoing and incoming are disabled. There is no problem about extension outgoing and incoming.

(5) If ISDN Message Accumulation Area Cannot be Captured

ISDN message cannot be created and held, and ISDN extension and ISDN trunk outgoing and incoming are disabled. Analog extension and analog trunk outgoing and incoming are enabled.

(6) If Camp-on Registration State Area Cannot be Captured

In trunk incoming, if incoming destination is busy, camp-on is disabled. Outgoing is enabled. Incoming is possible if incoming destination is not busy.

Thus, even if a certain area (resource) cannot be acquired, all system call processes are not disable, and possible call process and impossible call process occur depending on the type of the area not acquired (resource in shortage). Accordingly, if all resources are released by system resetting, adverse effects are caused on the process of normal operation.

Figures 4A, 4B:
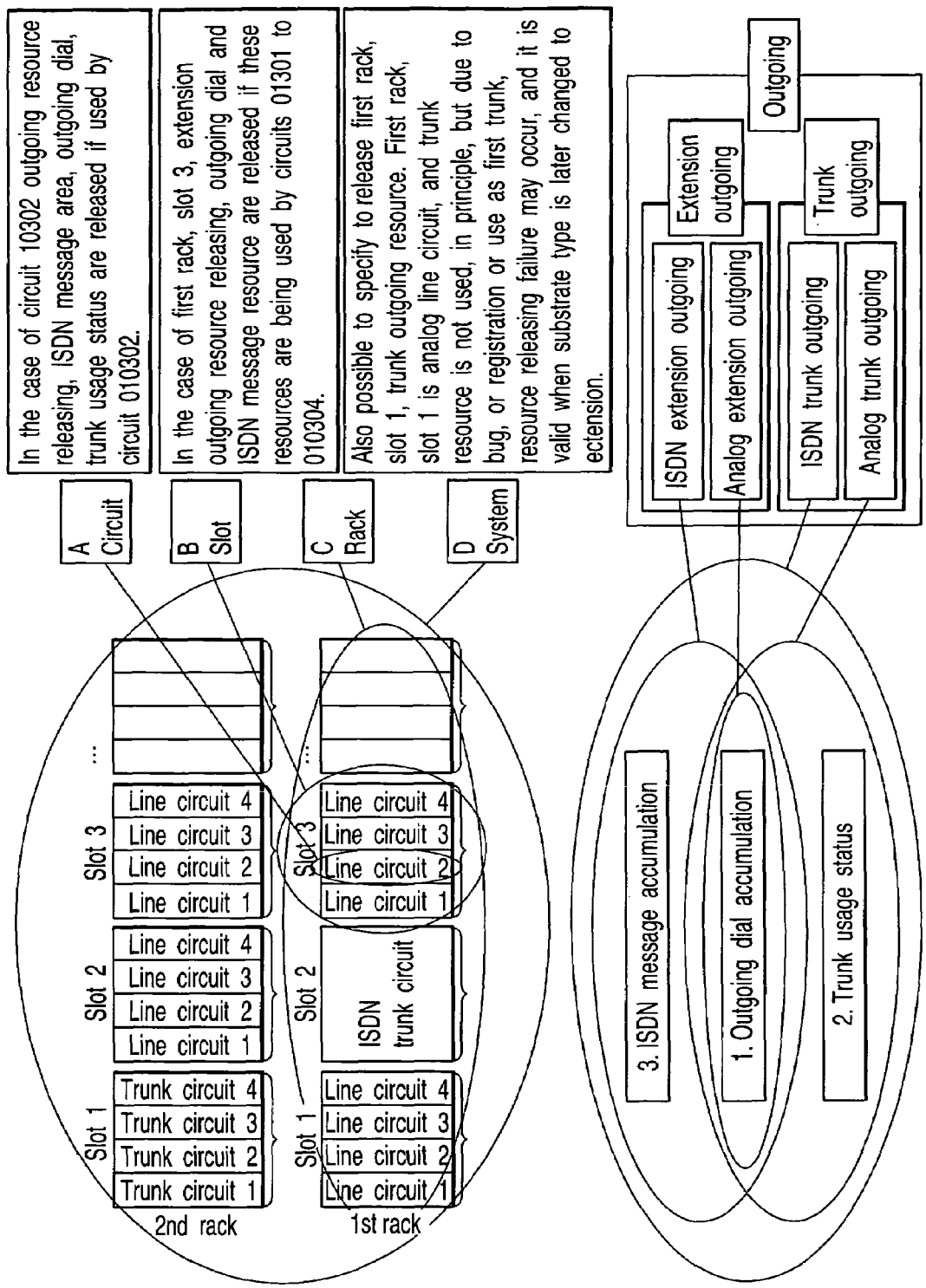
FIGS. 4A and 4B are a diagram showing a corresponding relation between a communication service function and a resource according to the first embodiment.

Accordingly, the resetting range is defined as shown in FIG. 4A, and the resource and the service are related as shown in FIG. 4B, and the resetting range of a specified resource is defined as follows.

Of the specified resources, if there is any terminal accommodated in the port specified to be reset, it is released.

Of the specified resources, if there is any terminal accommodated in the slot specified to be reset, it is released.

Of the specified resources, if there is any terminal accommodated in the rack specified to be reset, it is released.

Specified resources are released.

In the resource table 152, merely speaking, outgoing service relates to all resources of 1 to 3, and analog extension outgoing relates to outgoing dial accumulation area of 1.

According to this resource table 152, the resource specifying range is defined as follows.

(Resource Used by the Demanding Service Itself)

In the case of analog extension outgoing, the outgoing dial resource of 1 is specified.

(Resource Used by Service One Rank Higher)

In the case of analog extension outgoing, the resources (outgoing dial accumulation area, ISDN message area) about the extension outgoing (outgoing to analog extension, outgoing to ISDN extension) are specified.

(Resource Used by Service Another Rank Higher)

In the case of extension outgoing, all resources (outgoing dial accumulation area, ISDN message area, trunk usage state) about outgoing service (trunk ISDN outgoing, analog trunk outgoing, analog extension outgoing, ISDN extension outgoing) are specified.

Thus, by defining the services hierarchically, the highest rank expresses all services provided by the main apparatus 1. Herein, they are called z (all resources).

By such definition, by resetting the services by combination of a resetting range of specified resources of A to D, and a specifying range of resources of a to z, the services can be reset in steps.

(1-1) The port to which the terminal having a problem is connected is released if the outgoing dial accumulation area is used.

(1-2) The port to which the terminal having a problem is connected is released if the outgoing dial accumulation area or ISDN message accumulation area is used.

(1-3) The port to which the terminal having a problem is connected is released if the outgoing dial accumulation area or ISDN message accumulation area or trunk usage state area is used.

(1-4) The port belonging to the same slot as the terminal having a problem is released if the outgoing dial accumulation area is used.

(1-5) The port belonging to the same slot as the terminal having a problem is released if the outgoing dial accumulation area or ISDN message accumulation area is used.

Thereafter, the resource releasing range is similarly expanded in steps, and the fault is remedied. Finally, zD (resetting of all services in the system) is executed.

After releasing the resource in the specified range, the event having a problem is processed again. When the problem is not solved, the above procedure is executed, that is, the resources in the range one rank higher are released automatically, so that a system of higher reliability can be constructed.

Thus, according to the first embodiment, the control unit 14 manages the communication signals such as ISDN messages recorded in the resource area 151 of the storage unit 15 by resource classification, and controls to release the corresponding resource area 151 on the storage unit 15 by the communication service function demanding release. Therefore, without causing effects on other resources, only the resource having abnormality can be released by force.

Also in the first embodiment, on the basis of setting information of each resource information accumulated and managed in the resource table 152, appropriate resource releasing process can be executed in a simple procedure.

SECOND EMBODIMENT

Figure 5:
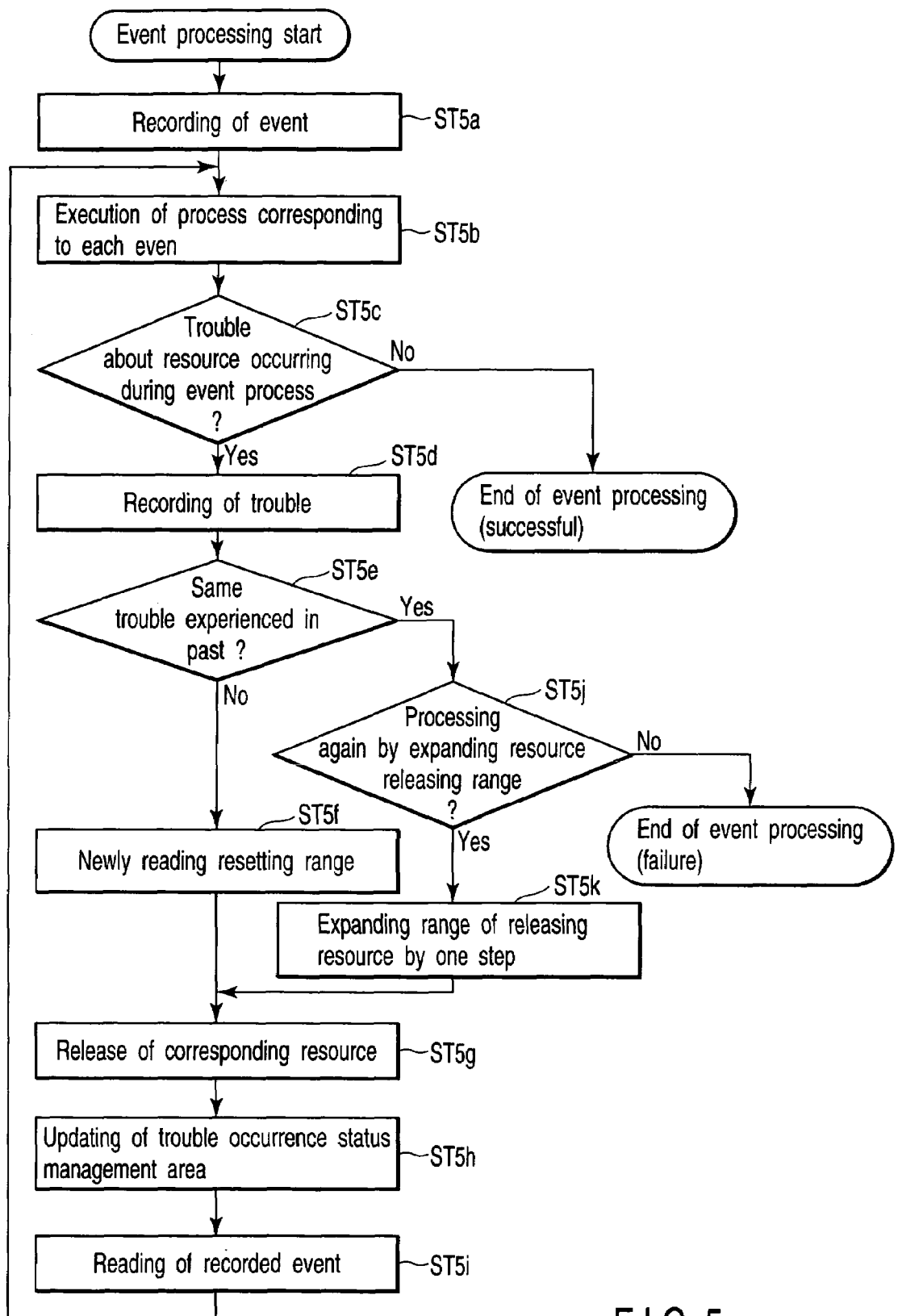
FIG. 5 is a flowchart showing control procedures of a control unit in an exchange system according to a second embodiment of the present invention.

FIG. 5 is a flowchart shoring process procedures of a control unit 14 in an exchange system according to a second embodiment of the present invention.

First, suppose a user of an extension terminal 2-1 turns the dial as outgoing operation to the extension terminal 2-2. As a result, the control unit 14 records this dial operation information in an area other than the resource area 151 in the storage unit 15 as an event (step ST5$a$). The control unit 14 records the event in an area corresponding to the resource area 151, and executes the processing (step ST5$b$).

In succession, the control unit 14 monitors whether a trouble about the corresponding resource has occurred or not during the event process (step ST5$c$), and terminates the event process if no problem occurs.

On the other hand, if a problem about the corresponding resource occurs during the event process (Yes), the control unit 14 records the trouble in the storage unit 15 (step ST5$d$), and determines whether or not a similar problem has occurred in the past (step ST5$e$). This is a first trouble (No), and the control unit 14 reads out the resetting range from the resource table 152 (step ST5$f$), releases the corresponding resource in the range (step ST5$g$), updates the trouble occurrence status management area (step ST5$h$), reads out the event already recorded in the storage unit 15 (step ST5$i$), and transfers to step ST5$b$.

If the problem is not solved by executing the event process again, the control unit 14 expands the resource releasing range according to the resource table 152, and determines whether or not to repeat the process until coinciding with the predetermined range or the trouble is solved by other means (step ST5$j$). In this case, if necessary to process again (Yes), the control unit 14 expands the releasing resource range by one step (step ST5$k$), and transfers to step ST5$g$.

If not necessary to process again (No), the control unit 14 terminates the event process.

In this way, according to the second embodiment, if a trouble occurs during execution of the communication service function, the control unit 14 automatically releases the corresponding resource area 151 in the storage unit 15. Therefore, the resource trouble does not spread to other resources, and occurrence of no call or occurrence of system down can be prevented.

In the second embodiment, also, after resource releasing, the corresponding event is read out from the storage unit 15, and the corresponding communication service function is executed again. Therefore, it is not necessary to start the communication service function in process from the beginning, and the operation can be restored quickly without having to wait for restoring operation.

THIRD EMBODIMENT

Figure 6:
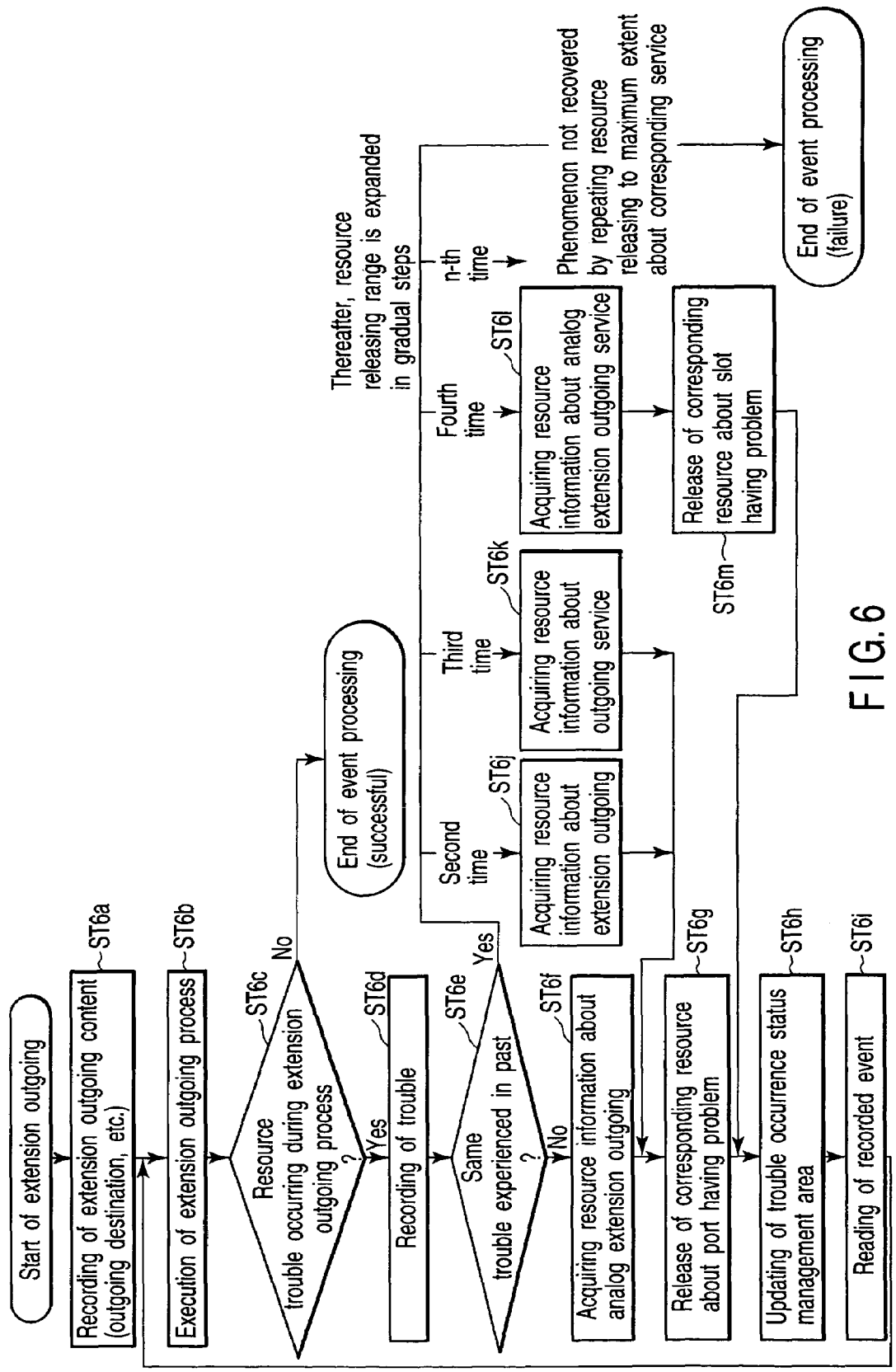
FIG. 6 is a flowchart showing control procedures of a control unit in an exchange system according to a third embodiment of the present invention.

FIG. 6 is a flowchart shoring process procedures of a control unit 14 in an exchange system according to a third embodiment of the present invention.

First, suppose the user of the extension terminal 2-1 turns the dial as outgoing operation to a subscriber terminal of the ISDN network. As a result, the control unit 14 records this dial operation information in an area other than the resource area 151 in the storage unit 15 as an event (step ST6*a*). The control unit 14 records the event in an area corresponding to the resource area 151, and executes the processing (step ST6*b*).

In succession, the control unit 14 monitors whether a trouble about the corresponding resource has occurred or not during the event process (step ST6*c*), and terminates the event process if no problem occurs, and forms a communication link with the ISDN network.

On the other hand, if a problem about the corresponding resource occurs during the event process (Yes), the control unit 14 records the trouble in the storage unit 15 (step ST6*d*), and determines whether or not a similar problem has occurred in the past (step ST6*e*). This is a first trouble (No), and the control unit 14 reads out the resource information about analog extension outgoing from the resource table 152 (step ST6*f*), releases the corresponding resource about the port having a trouble (step ST6*g*), updates the trouble occurrence status management area (step ST6*h*), reads out the event already recorded in the storage unit 15 (step ST6*i*), and transfers to step ST6*b*.

If the problem is not solved by executing the event process again, the control unit 14 acquires the resource information about the extension outgoing from the resource table 152 (step ST6*j*), and transfers to step ST6*g* again.

Yet, if the problem is not solved by executing the event process, the control unit 14 acquires the resource information about the outgoing service of one step higher from the resource table 152 (step ST6*k*), and transfers to step ST6*g* again.

Still more, if the problem is not solved by executing the event process, the control unit 14 acquires the resource information about the analog extension outgoing from the resource table 152 (step ST6*l*), releases the corresponding resource about the slot having a trouble (step ST6*m*), and transfers to step ST6*h* again.

Such process is repeated n times until the problem is solved while expanding the range. If the problem is not solved after repeating n times, the control unit 14 resets the hardware in the extension IF 13, trunk line IF 12, and main apparatus 1.

In this way, according to the third embodiment, if a trouble occurs during execution of the communication service function, the control unit 14 automatically releases the corresponding resource area 151 in the storage unit 15, and the function having the trouble is released and processed in the resource unit. If not recovered, the resetting range is expanded in gradual steps, so that it is possible to recover from trouble without giving any substantial effects on other services.

In the third embodiment, if not recovered from trouble by releasing the resource, by resetting the hardware in the extension IF 13, trunk line IF 12, and main apparatus 1, it is possible to restore quickly from trouble, and a system of higher reliability can be provided.

OTHER EMBODIMENTS

The invention is not limited to these embodiments alone. For example, in the third embodiment, by expanding the application range of resetting service about the port, if not restored, the application range of resetting service is expanded similarly about the slot. But not limited to this extent, by further expanding to the rack, more quick service restoration is possible.

Moreover, a system of higher reliability can be constructed by applying this procedure automatically, from the trouble occurrence port and trouble occurrence service contained in the error message outputted from the system.

In the event of trouble, instead of expanding the application range in gradual steps, resetting of service may be applied to the entire system from the beginning, and faster service restoration is possible. For example, due to resource usage status abnormality about line wire outgoing, if the user requests declaration of impossibility of line wire outgoing by the entire system, the system manager can release the entire resources about the line wire outgoing service in the entire system, without consideration of detailed investigation or system reset timing (resetting in lunch time or after work). Therefore, it is possible to restore from trouble promptly without giving any effect on extension communication or other services.

In the second and third embodiments, examples of releasing process of the corresponding resource at the time of occurrence of a trouble have been explained. But not limited to these examples, the resource may be released on the condition of user's request or illegal use of the resource.

Also in these embodiments, examples of setting the resource table and resource area in the same storage unit have been explained, but they may be also provided on different storage units.

Further, the system type and configuration, main apparatus construction, stored contents in the resource table, and resource releasing procedures may be changed and modified without departing from the true spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A telephone exchange apparatus for accommodating a plurality of extensions adapted to connect telephone terminals to each terminal end and connecting at least one line wire, the telephone exchange apparatus executing communication service functions relating to at least one of switches between mutual extensions, between an extension and a line wire, and between mutual line wires, comprising:

a memory which stores data showing a corresponding relation between a plurality of mutually different communication service functions defined hierarchically and a plurality of resources for executing the communication service functions, wherein the communication service functions include a plurality of first-level communication service functions and a plurality of second-level communication service functions, the plurality of first-level communication service functions being included in the plurality of second-level communication service functions, and the plurality of second-level communication service functions being included in all the communication service functions;

a recorder which records communication signals for processing in the each resource, on a recording medium;

a processor which processes the communication signals on the recording medium based on the corresponding resource stored in the memory; and a controller which controls to manage the communication signals on the recording medium by each resource, releases a corresponding resource area on the recording medium according to the first-level communication service function requesting to release, without releasing resource areas corresponding to other levels of communication service functions, releases corresponding resource areas on the recording medium corresponding to the second-level communication service functions, and releases the corresponding resource areas on the recording medium corresponding to all the communication service functions according to a predetermined condition, based on the data stored in the memory.

2. The telephone exchange apparatus according to claim 1, wherein the memory stores a resource table stored therein setting information showing at least one of the vacancy and occupancy, and source of capturing if occupied, about each one of the plurality of resources, and the controller releases the corresponding resource area in the recording medium, based on the communication service function requesting to release, and updates the corresponding setting information in the resource table to vacancy.

3. The telephone exchange apparatus according to claim 2, wherein the controller releases sequentially a plurality of corresponding resource areas in the recording medium in a release requesting range based on the resource table.

4. The telephone exchange apparatus according to claim 1, wherein the controller releases the corresponding resource area in the recording medium according to a predetermined condition.

5. The telephone exchange apparatus according to claim 4, wherein the controller utilizes a trouble which occurs during execution of the communication service function according to a determination condition.

6. The telephone exchange apparatus according to claim 1, further comprising:

another recording medium which records processing information corresponding to the communication service function for requesting to release, wherein the controller releases the corresponding resource area in the recording medium based on the communication service function requesting to release, and then reads out the processing information from another recording medium, and executes the corresponding communication service function automatically.

7. The telephone exchange apparatus according to claim 6, wherein the controller releases the corresponding resource area in the recording medium when a trouble occurs during execution of the communication service function requesting to release, and then reads out the processing information from another recording medium, and executes the corresponding communication service function automatically.

8. The telephone exchange apparatus according to claim 1, wherein the controller releases the plurality of corresponding resource areas on the recording medium, at least in every one of an extension, a line wire, a slot, a rack, and a system, based on the communication service function requesting to release.

9. The telephone exchange apparatus according to claim 1, wherein the controller executes at least one of controlling on/off and resetting, an interface which accommodates the extensions, an interface which accommodates the line wire, and a hardware in the apparatus based on the request.

10. A control method for use in a telephone exchange apparatus for accommodating a plurality of extensions adapted to connect telephone terminals to each terminal end and connecting at least one line wire, the telephone exchange apparatus executing communication service functions relating to any one of exchanges between mutual extensions, between an extension and a line wire, and between mutual line wires, the control method comprising:

storing data showing a corresponding relation between a plurality of mutually different communication service functions defined hierarchically and a plurality of resources for executing the communication service functions, wherein the communication service functions include a plurality of first-level communication service functions and a plurality of second-level communication service functions, the plurality of first-level communication service functions being included in the plurality of second-level communication service functions, and the plurality of second-level communication service functions being included in all the communication service functions;

recording communication signals for processing in each resource, on a recording medium, and managing the communication signals on the recording medium by each resource, and releasing a corresponding resource area on the recording medium according to the first-level communication service function requesting to release, without releasing resource areas corresponding to other levels of communication service functions, releasing corresponding resource areas on the recording medium corresponding to the second-level communication service functions, and releasing the corresponding resource areas on the recording medium corresponding to all the communication service functions according to a predetermined condition.

11. The method according to claim 10, wherein the storing includes storing a resource table stored therein setting information showing at least one of the vacancy and occupancy, and source of capturing if occupied, about each one of the plurality of resources, and the managing includes releasing the corresponding resource area in the recording medium, based on the communication service function requesting to release, and updates the corresponding setting information in the resource table to vacancy.

12. The method according to claim 11, wherein the managing includes releasing sequentially a plurality of corresponding resource areas in the recording medium in a release requesting range based on the resource table.

13. The method according to claim 10, wherein the managing includes releasing the corresponding resource area in the recording medium according to a predetermined condition.

14. The method according to claim 13, wherein the managing includes utilizing a trouble which occurs during execution of the communication service function according to a determination condition.

15. The method according to claim 10, further comprising:

recording processing information corresponding to the communication service function for requesting to release, on a recording medium for releasing, wherein the managing includes releasing the corresponding resource area in the recording medium based on the communication service function requesting to release, and then reading out the processing information from the recording medium for releasing, and executing the corresponding communication service function automatically.

16. The method according to claim 15, wherein the managing includes releasing the corresponding resource area in the recording medium when a trouble occurs during execution of the communication service function requesting to release.

17. The method according to claim 10, wherein the managing includes releasing the plurality of corresponding resource areas on the recording medium, at least in every one of an extension, a line wire, a slot, a rack, and a system, based on the communication service function requesting to release.

18. The method according to claim 10, wherein the managing includes executing at least one of controlling on/off and resetting, an interface which accommodates the extensions, an interface which accommodates the line wire, and a hardware in the apparatus based on the request.

* * * * *